United States Patent [19]

Johnson

[11] Patent Number: 5,188,060
[45] Date of Patent: Feb. 23, 1993

[54] PORTABLE AND COLLAPSIBLE LIVESTOCK FEEDER

[76] Inventor: Stephen W. Johnson, 1805 West 8660 South, West Jordan, Utah 84088

[21] Appl. No.: 872,053

[22] Filed: Apr. 22, 1992

[51] Int. Cl.⁵ .............................................. A01K 5/00
[52] U.S. Cl. ..................... 119/58; 119/51.03
[58] Field of Search ............... 119/58, 59, 60, 52.1, 119/51.03, 61

[56] References Cited

U.S. PATENT DOCUMENTS

| | | | |
|---|---|---|---|
| 784,455 | 3/1905 | Warren | 119/58 |
| 807,197 | 12/1905 | O'Brien | 119/58 |
| 943,489 | 12/1909 | Torrey | 119/58 |
| 988,599 | 4/1911 | Shaw | 119/60 |
| 1,049,963 | 1/1913 | Young | 119/61 |
| 3,362,382 | 1/1968 | Frasier | 119/58 |
| 4,457,264 | 7/1984 | Maier | 119/58 |
| 4,976,222 | 12/1990 | Cooke | 119/60 |

FOREIGN PATENT DOCUMENTS

| | | | |
|---|---|---|---|
| 903598 | 6/1972 | Canada | 119/58 |
| 848432 | 9/1952 | Fed. Rep. of Germany | 119/58 |
| 1032018 | 6/1958 | Fed. Rep. of Germany | 119/60 |
| 1011021 | 11/1965 | United Kingdom | 119/60 |

*Primary Examiner*—Gene Mancene
*Assistant Examiner*—Todd E. Manahan
*Attorney, Agent, or Firm*—M. Ralph Shaffer

[57] ABSTRACT

A portable and collapsible livestock feeder, is designed for both easy erection and also for collapsed storage for transport, manual or otherwise. The side panels of the feeder are hinged, or otherwise pivotally secured, to a back panel of the structure, and a hinged bottom is also attached to the back panel. A feeder grate maintains a lower horizontal pivotal connection with the back panel, but is releasably attached, when in a forwardly sloping condition, at its upper portion to and between the side panels. Releasing the grate from the side panels enables the grate to be thrust back and swing against the back panel for storage when the side panels are collapsed over the grate. Tail gate support brackets are provided for mounting the feeder. The grate extends upwardly above the collapsed feeder to provide a handle.

9 Claims, 3 Drawing Sheets

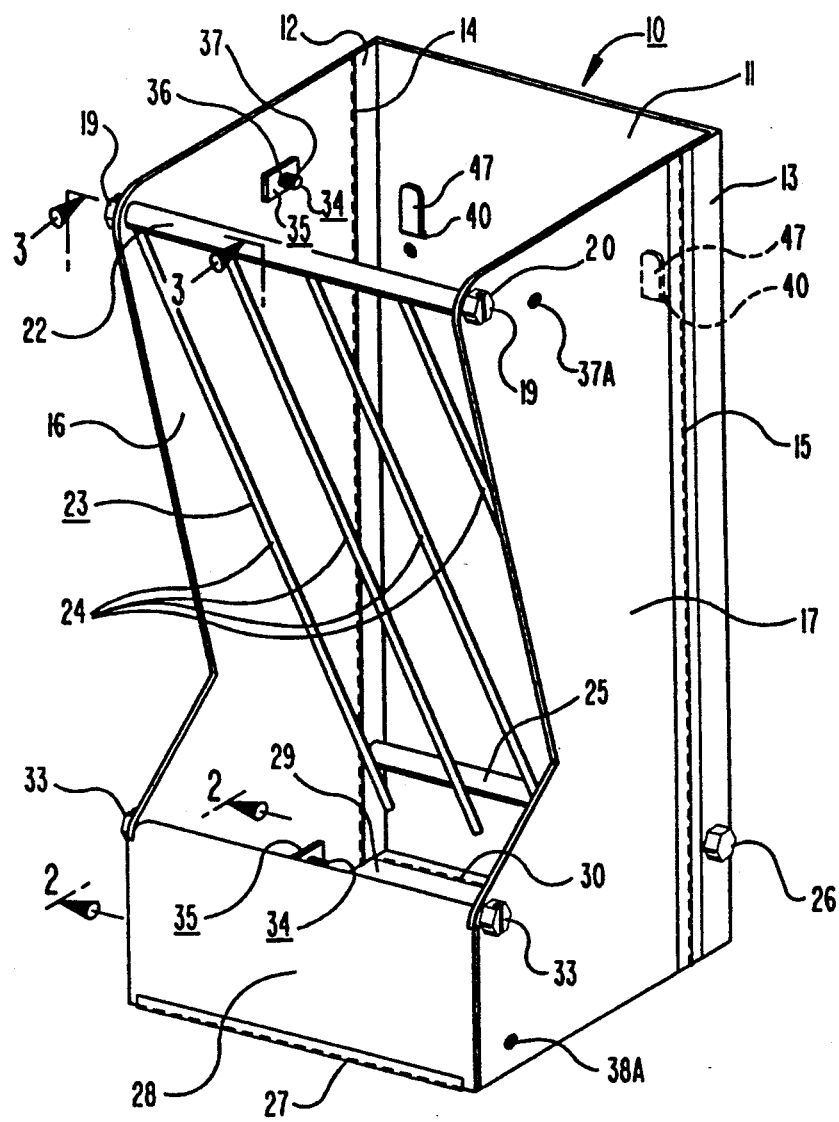
FIG. 1
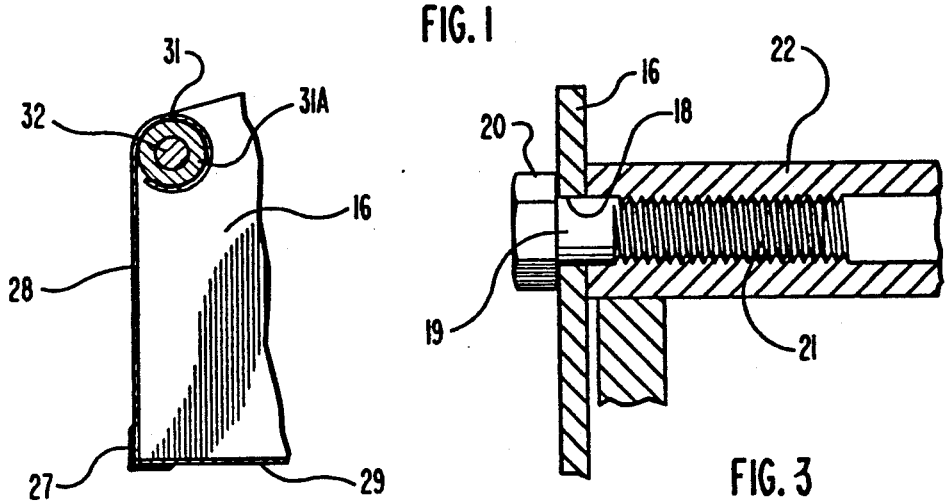
FIG. 2
FIG. 3

PORTABLE AND COLLAPSIBLE LIVESTOCK FEEDER

FIELD OF INVENTION

The present invention relates to and provides a portable and collapsible livestock feeder, for use principally by horses and cattle, which structure may be suitably erected and bolted together at a desired location for operable use and then, subsequently, collapsed and secured for storage, transport and the like.

BACKGROUND AND BRIEF DESCRIPTION OF PRIOR ART

There have been a number of different types of fixed bins and fixed installations, for accommodating the feeding of livestock. Frequently, livestock personnel will desire to transport horses or cows to various locations and then provide a suitable temporary feeding facility for the livestock. In the past, this has taken the form of simply transporting a few bails of hay in a pickup truck or other vehicle, and then forking sufficient hay onto the ground to accommodate the cattle. Other types of temporary feeding facilities, of course, have been used.

No art is currently known to the named inventor herein which accommodates for both collapse and erection of a portable cattle feeder, and particularly in a manner so as to render great convenience to a user and also erection and suspension of the feeder from the tailgate of a pickup truck, for example.

BRIEF DESCRIPTION OF INVENTION

In the present invention, the livestock feeder is comprised of a series of panels, namely, back or rear and also opposite side panels, and likewise front and bottom panels, which are provided with panel-attachment hinges, preferably piano hinges, so as to render the panels easily collapsible. Certain ones of the panels are provided flanges which are configured to be of different widths, this to accommodate a desired sequence in the folding of the panels for collapse toward the back panel of the unit. A feeder grate is provided and is releasably secured in angulated orientation so as to provide bin or well for the receipt of alfalfa, hay and other types of animal feed. The side, rear or back, and bottom and front panels are configured to form a drop-out bin for receiving feed that is pulled thorugh the grates but not immediately consumed by cattle. Bolts and wingnut-type bolt securement structure are utilized in securing the various panels together and to the grate. These bolts are easily removed and stored so as to accommodate the collapse of the various panels in a manner such that the grate is secured in upstanding position relative to the flat collapsed panel assembly. The grate is designed to extend above the upper end of the back panel, when in stored condition, so as to provide a panel for the unit. Offset brackets are provided, with suitable attachment structure as necessary, to accommodate the hanging of the unit from the tailgate of a pickup truck, or from other horizontal support structure.

OBJECTS

Accordingly, a principal object of the present invention is to provide a new and useful, portable and collapsible livestock feeder optionally having covenient feeder-suspension structure.

A further object of the invention is to a provide a feeder of the type described having a feeder grate, the latter being constructed for forward angulated disposition when the structure is erected and also for vertical, rearward collapsed position when the feeder itself is collapsed.

An additional object is to provide a livestock feeder wherein the grate thereof is also useful as a handle, for easy transport of the unit when the same is in collapsed position.

An additional object of the present invention is to a provide a cattle feeder wherein the various enclosure panels thereof are constructed for easy and sequential folding whereby to collapse the feeder into a more or less flattened condition for storage or transport.

DRAWINGS

The features of the present invention, both as to its organization and manner of operation, are best understood by reference to the following specification and description, taken in connection with the accompanying drawings in which:

FIG. 1 is a perspective view of a livestock feeder constructed in accordance with a preferred embodiment of the invention.

FIG. 2 is an enlarged fragmentary section taken along the line 2—2 in FIG. 1.

FIG. 3 is an enlarged fragmentary section taken along the line 3—3 in FIG. 1.

Figure 7:
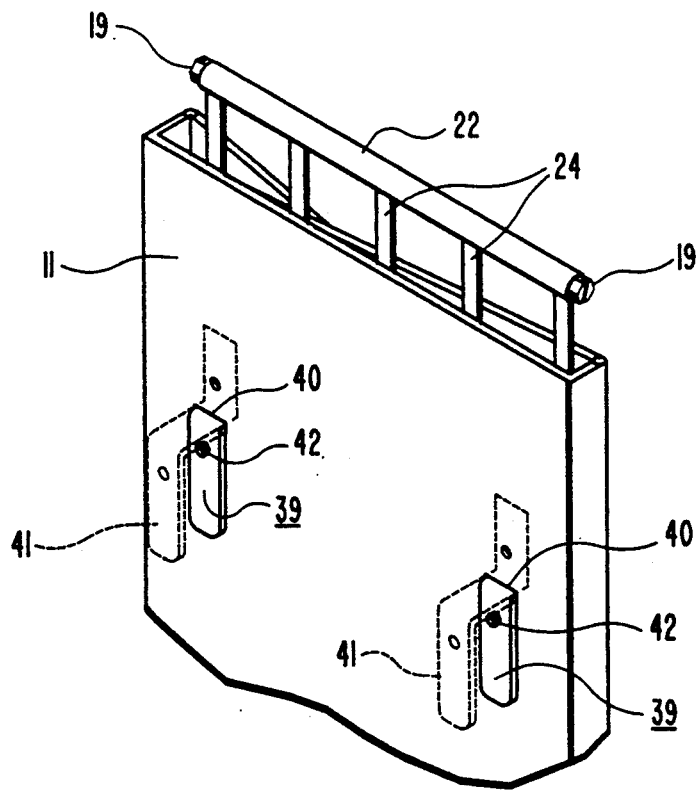

FIG. 7 illustrates in dotted lines the offset angle-brackets or brackets used to releasably secure and thus suspend the unit relative to a pickup truck, and in the solid line designations, the collapse of the brackets inwardly and their securement by screws so that there is essentially a flush mount of the brackets relative to the exterior of the unit, thereby avoiding interference with other objects that might otherwise snag onto the offset brackets.

DETAILED DESCRIPTION OF PREFERRED EMBODIMENTS

Figure 4:
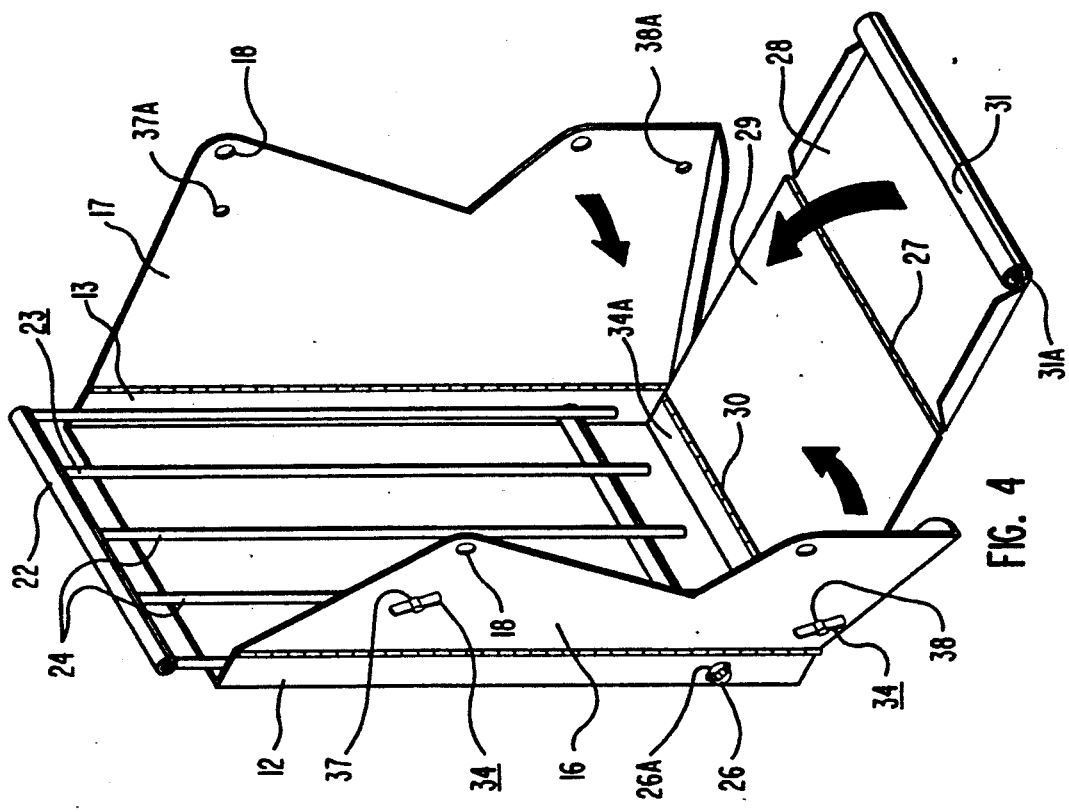
FIG. 4 illustrates the structure of FIG. 1 wherein certain bolts are removed and stored and the various panels are collapsed in sequence to achieve a collapsed condition of the unit which is now ready for transport and storage; the sequence chosen in this particular embodiment are the front and bottom panels to be folded first, followed by the left side panel and lastly the right side panel.

In FIG. 1, the portable and collapsible livestock feeder 10 includes a back panel 11 having a pair of side flanges 12 and 13 respectively provided with piano hinges 14 and 15. The respective piano hinges 14 and 15 secure the left side panel 16 and right side panel 17 to the side flanges 12 and 13, respectively. Apertures 18, see FIGS. 3 and 4, are supplied in each of the side panels 16 and 17 for the reception of respective grate securement bolts 19. These grate securement bolts 19 have slotted heads 20 and respective threaded shafts 21, and secure the opposite ends of internally threaded tubular rod 22 of feeder grate 23 to the left and right side panels 16 and 17. It is noted that the grate securement bolts 19 can be removed to allow for the inward placement of the grate as hereinafter described.

Figure 6:
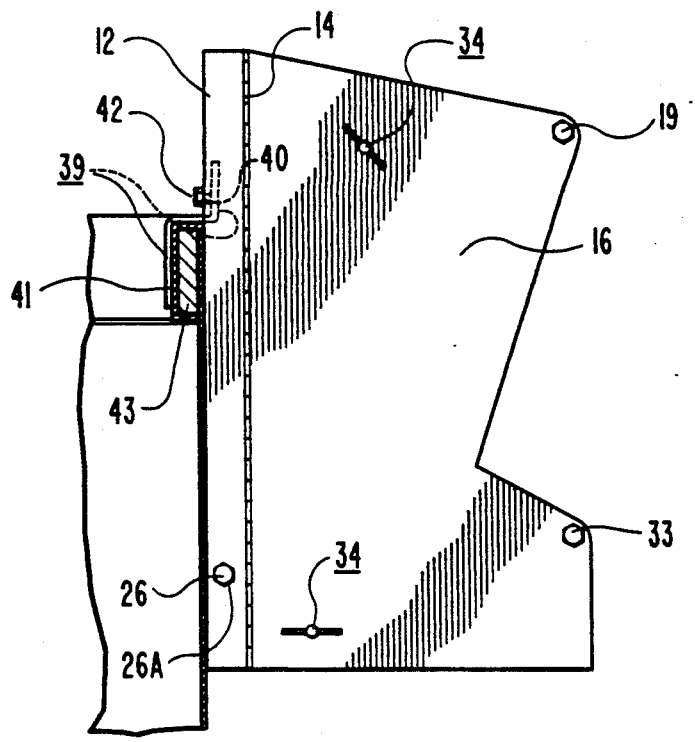
FIG. 6 is a fragmentary side elevation of the unit of FIG. 1 when the same is suspended from and supported by the top rail of the rear tailgate of a pickup truck.

Feeder grate 23 includes a series of grate bars 24 which are welded or otherwise secured to the mutually vertically spaced, horizontal tubular rods 22 and 25. Tubular rod 25 is likewise interiorly threaded at its opposite ends and accommodates the threaded placement of axially aligned securement bolts 26, through respective apertures 26A of side flanges 12, 13, one being shown, see FIGS. 4 and 6.

Piano hinge 27 is secured to front panel 28 and bottom panel 29 and thus allows for the pivotal displacement of the front panel 28 relative to bottom panel 29. Correspondingly, bottom panel 29 is provided with a piano hinge 30 that is also secured to flange 34A of back panel 11.

It is seen in FIG. 2 that the front panel 28 includes a developed upper margin 31 that is curled over and secured to the lowermost, internally threaded horizontal hollow rod 31A which threadedly receives threaded shafts 32 of bolts 33.

The threaded bolts may be secured to the lower rod 31A in the same manner as threaded bolts 19 secure the rod 22 in place.

In a preferred form of the invention, a series of wingnut-type bolts 34, see FIG. 4, will be employed, and, for storage as well as threaded securement, one or more welded plates 35 may be welded to the interior of left side panel 16, for example, and be threaded at aperture 36. Accordingly, these bolts 34 are simply turned into these plates, with accommodating side panel apertures 37 and 38 being provided and disposed in alignment with the drilled and tapped apertures 36 of plates 35. Thus, when the unit is to be collapsed, then bolts 19 and 33 are removed so as to allow for the upward folding of front panel 28 and bottom panel 29, owing to the inclusion of piano hinges 27 and 30. Subsequently, the left side panel 16 is collapsed inwardly and the right side panel 17 folded inwardly over the entire assembly such that the wingnut type bolts are now replaced in apertures 37A and 38A and threaded through plate apertures 36 which are now in alignment with side panel apertures 37 and 38 previously accommodating the stored insertion of the bolts 34. This folding operation is accomplished, of course, after the bolts 19 have been removed so that the feeder grate 23 may be positioned inwardly in the manner as seen in FIG. 4. The feeder grate thus is longer than the vertical dimension of the panels, at least above bolts 26, this so the rod 22 may serve as a handle for easy portage of the unit. Bolts 33, when not in use, can simply be stored at the bottom of the unit.

Figure 5:
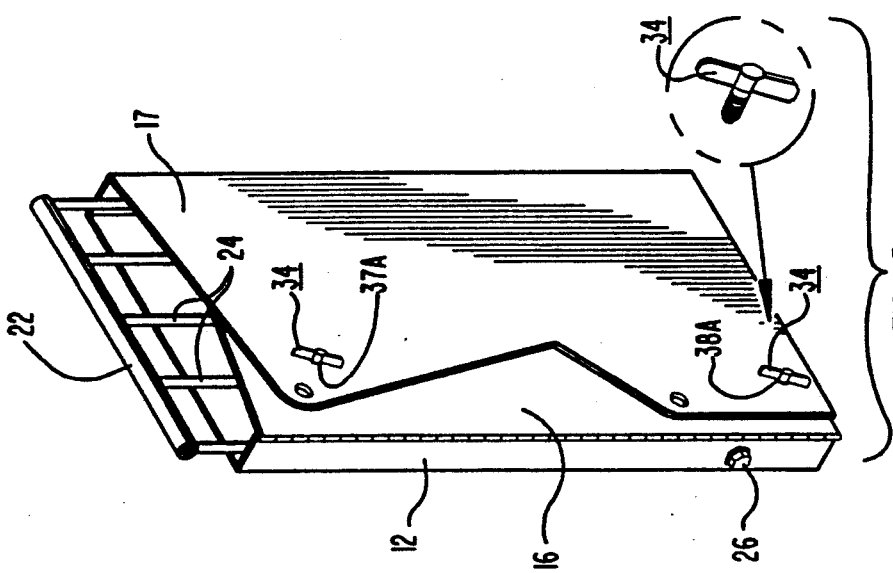
FIG. 5 illustrates the structure of FIG. 4 in stored and secured condition.

Bolts 34, see FIG. 5, can have chisel-type tips for serving as screw drivers to rotate the various other bolts, this by their insertion into the slotted heads of the bolts.

A pair of offset brackets 39 are provided in slots 40 and, when urged outwardly, serve as overlapping lips 41 for mounting over the tailgate of a pickup truck or other support object. Where desired, bolts 42 may be included for securing the brackets in place relative to back panel 11. When the assembly is disconnected from its mounting to the tailgate of a pickup truck, for example, then the offset brackets may be thrust inwardly and this time the bolts 42 are replaced as to position so that the same can secure the offset bracket directly against the rear surface of back panel 11 so as not to catch on any external object. Apertures, threaded or otherwise, may be provided in the offset brackets and also in the rear panel 11 to accommodate such fixing of the disposition of such offset brackets.

In FIG. 7, the dotted lines at 41 indicating these offset brackets illustrate the positioning of the brackets 39 for tailgate hookup. The upper part of the pickup truck's tailgate is designated as 43 in FIG. 6.

Threaded bolts 33 can be otherwise threadedly stored; correspondingly, bolts 19 may be re-threaded into the rod 22, see FIG. 7.

Accordingly, what is provided is a new and improved feeder for livestock, this of a type that can be collapsed and easily carried and otherwise made portable to designated sites. The unit can be adapted for suspension from the tailgate of a pickup truck or other object to accommodate livestock feeders, cattlemen, and the like. Relative to the offset flanges at 34, 12 and 13, see FIG. 4, it will be seen that the selected widths of the flanges will be staggered so that the bottom and front panels can be folded first, followed by collapse inwardly of the left side panel and finally collapse of the outside panel. Accordingly, the side flange 13 of right side panel 17 will be progressively greater in width wise dimension than the other two offset side flanges. Feeder grate 23 tapers slightly from top to bottom (about ½ inch) for easier inward placement of grate. Bottom panel 29 tapers slightly from back to front (about ½ inch) for easier placement in folding.

The unit is thus uniquely adapted for collapse and storage, and also for easy portage and installation at a selected site. The feeder grate 23 defines with the right and left side panels and also back panel 11, a storage bin for receiving hay, alfalfa, and so on. The side panels cooperate with the rear panel and also bottom 29 and front panel 28 for providing a well for catching feed that is not directly eaten by horses or cows immediately upon being pulled through the feeder grate.

While particular embodiments have been shown and described, it will be obvious that various changes and modifications may be made without departing from the essential aspects of the invention and therefore the aim in the appended claims is to cover all such changes and modifications that fall within the true spirit and scope of the invention.

I claim:

1. A portable and collapsible livestock feeder including, in combination, an upstanding back panel having opposite sides, a top edge, and a bottom; right and left side panels hingedly secured to said back panel at said opposite sides; a bottom panel hingedly secured to said back panel at said bottom; a front panel hingedly secured to said bottom panel and provided with means for releasable securement of said front panel, in erect position, to said side panels; a feeder grate in installed condition angulating upwardly and forwardly relative to said back panel, said feeder grate having a lower portion fixedly maintained in pivotal securement to said back panel and also an upper portion releasably secured to said side panels; said right and left side panels, and the combination of said bottom and front panels, being constructed to collapse inwardly toward said feeder grate, thereby forcing said feeder grate to pivot inwardly against said back panel and thus retain said feeder grate against said back panel, when said feeder grate upper portion is freed from securement with said right and left side panels; and means for securing said panels in collapsed condition whereby to condition said feeder for transport and storage.

2. The feeder of claim 1 wherein said back panel has forwardly oriented side-opposite side flanges, said lower portion of said feeder grate being pivotally connected horizontally to said flanges.

3. The feeder of claim 1 wherein said back panel has forwardly oriented side-opposite side flanges and also a bottom flange, said side panels being hingedly secured to said side flanges, said bottom panel being hingedly secured to said bottom flange, said side flanges and bottom flange each having a horizontal width, the widths of said flanges being varied for off-set, thereby permitting sequential unconstrained folding of said bottom panel and said side panels for placing said panels in the collapsed condition.

4. The feeder of claim 1 wherein said side and bottom panels are provided with piano-type hinges for effecting the hinged connection of said panels with said back panel and said back panel having offset forwardly projecting side flanges pivotally secured to said side panels.

5. The feeder of claim 1 wherein said means for securing said panels in collapsed condition comprises apertures in each of said side panels, said apertures being mutually aligned when said panels are in collapsed condition, the apertures in at least one of said side panels being threaded, and a wing-nut type bolt having a chisel-type end received in said aligned apertures; wherein said means for releasable securement of said front panel to said side panels comprises a plurality of slotted-head bolts; and wherein said upper portion of said feeder grate is releasably secured by another plurality of slotted-head bolts; and whereby said chisel-type end of said wing-nut type bolt is usable to turn said slotted-head bolts.

6. The feeder of claim 1 wherein said feeder grate is constructed and dimensioned to so protrude above said back and side panels when said feeder is in collapsed condition, said upper portion of said feeder grate comprising a rod now serving as a handle, for lending portability of said structure.

7. The feeder of claim 1 wherein said feeder grate comprises mutually spaced upper and lower horizontal tubular rods and mutually spaced vertically oriented grate bars secured to said tubular rods, said upper tubular rod extending above said back panel, and thus serving as a handle, when said feeder is in collapsed condition.

8. A portable and collapsible livestock feeder including, in combination, a back, opposite sides and bottom structure, said opposite sides and bottom structure being hingedly secured to said back, a slanted feeder grate in fixedly maintained pivotal securement with said back and in forward temporary securement with said sides and defining therewith an upper feed-receiving bin and a lower feed-dropping well, and means for foldably securing said bottom structure over said sides, when collapsed, and also over said feeder grate when said feeder grate is repositioned for storage directly against said back.

9. A portable and collapsible livestock feeder including, in combination, an upstanding back panel having opposite sides, a top and a bottom, and provided with pair of horizontally aligned, mutually spaced slots; a pair of z-shaped offset brackets received by said slots and constructed for looping over and thereby supporting said feeder from an external horizontal structure; means for securing said brackets against said back panel in a chosen position; right and left side panels hingedly secured to said back panel at said opposite sides; a bottom panel hingedly secured to said back panel at said bottom; a front panel hingedly secured to said bottom panel and provided with means for releasable securement of said front panel to said side panels; a feeder grate, in installed condition, angulating upwardly and forwardly relative to said back panel, said feeder grate having a lower portion pivotally secured to said back panel and also an upper portion releasably secured to said side panels; said right and left side panels, and the combination of said bottom and front panels, being constructed to collapse inwardly toward said feeder grate, and thus retain said feeder grate against said back panel, when said feeder grate upper portion is freed from securement with said right and left side panels; and means for so securing said panels in collapsed condition whereby to condition said feeder for transport and storage.

* * * * *